Oct. 13, 1959   R. C. SCHMIDT, JR   2,908,303
MACHINE TOOL ACCESSORY
Filed Feb. 12, 1957

INVENTOR:
Reinhold C. Schmidt, Jr.

BY Ross C. Hurrey
ATTORNEY 2,908,303

MACHINE TOOL ACCESSORY

Reinhold C. Schmidt, Jr., McKeesport, Pa.

Application February 12, 1957, Serial No. 639,657

1 Claim. (Cl. 144—290)

This invention pertains to machine tools, and more particularly to an accessory in the nature of a combined spacer, hold down clamp and separator by which it is possible to perform operations upon multiple work pieces of different kinds, shapes or sizes, at one and the same time.

In shops and factories, it is often desirable to perform the same operation, such as cut-off sawing, grooving or the like upon a set or series of different workpieces. When the machine tool is provided with the usual vise, it is necessary to clamp the pieces, one at a time, and perform the operation upon them in succession. This is because only in rare instances can two or more pieces be held in the vise at one time. Rounds, for example, even if of the same diameter, will either cam one another outwards as the vise is tightened (if side by side relative to the jaws), or only one will be held tight if they are stacked perpendicular to the direction of jaw movement. Different size pieces can very rarely be held together in the vise.

Since machine tools normally have adequate power for cutting the maximum width the jaws will hold, the successive-operation technique heretofore required is wasteful of power, machine time and labor. The present invention has for its main object the provision of an accessory, the use of one or more of which will enable plural like or (more especially) even different shapes to be held firmly for simultaneous treatment by the machine. Thus rounds, hex shapes, flats or bars may be mixed and cut at one operation.

A further object of the invention is to provide an accessory of the above type whose use requires no change or modification whatever in the usual vise arrangement of standard machine tools.

Another object of the invention is to provide an accessory of this kind whose operation is extremely simple and fast, and requires no great skill or special instruction.

A further object of the invention is to provide such an accessory which is easy to fabricate at low cost, yet is rugged and reliable under hard usage.

Figure 1:
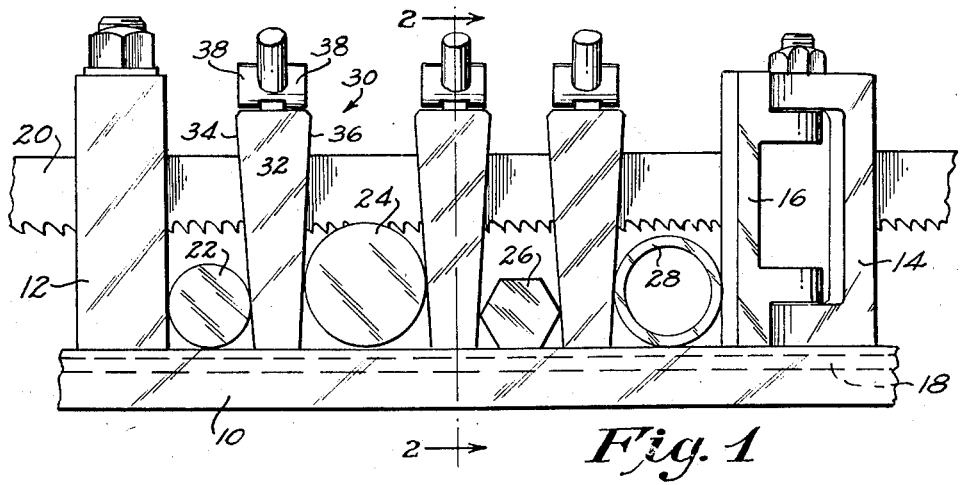
Figure 2:
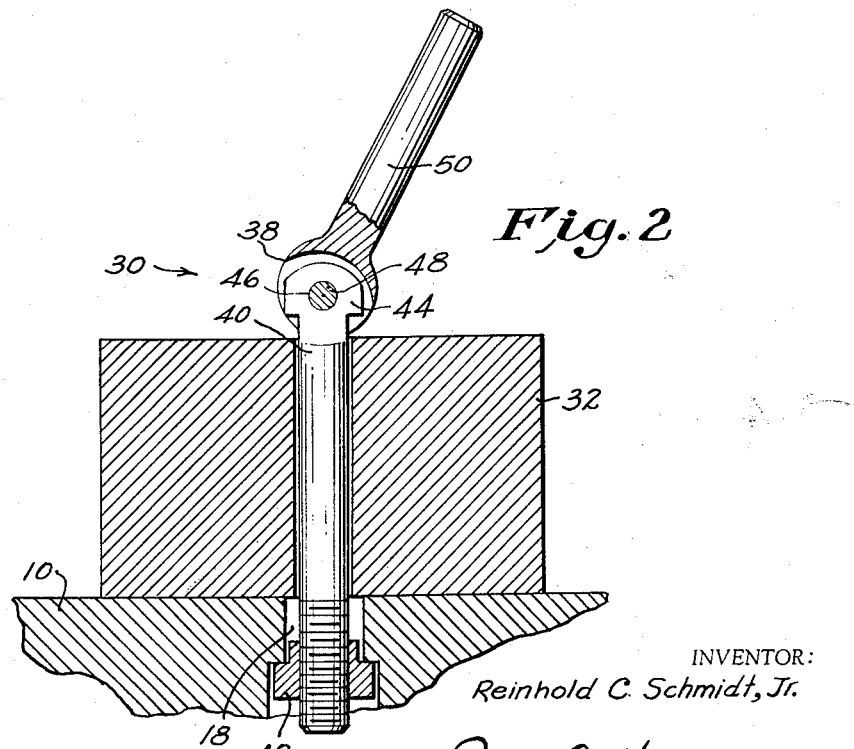

The above and other objects of the invention will best be understood by referring now to the following detailed specification of a preferred embodiment thereof, given by way of example, and to the accompanying drawings, in which:

Figure 1 is a fragmentary elevational view of the preferred form of the invention, shown in use in connection with the work table of a known form of power saw, and Figure 2 is a sectional view taken on the line 2—2 of Figure 1.

While the invention may be applied in various situations and to a variety of machine tool operations, it is especially valuable in making multiple saw cuts in or through plural work pieces. Such an application is described in detail below, but it is to be understood that such description is by way of example and is not intended to limit the invention to such machines or operations.

Referring now to Figure 1 of the drawings, numeral 10 designates the table or base of a power band saw of conventional form. For holding work on the table, usual vise mechanism is provided, including opposed jaw members 12 and 14, of which the latter is shown as having the swivel type face 16 to align itself with the work. The jaws may be movable, one or both or held in place by bolts (not shown) engaging at their lower ends with square nuts received in usual T-slots such as that designated by 18. The saw blade is shown at 20, the same passing behind the jaw members 12 and 14 in Figure 1, and partly out into one of the work pieces.

Ordinarily, only one work piece may be held satisfactorily by the jaws. The present invention provides an accessory of which three are shown in use in Figure 1, to enable four workpieces to be clamped for simultaneous cutting. These pieces comprise solid rounds 22 and 24, a hex bar 26 and a pipe 28, all of different effective widths or diameters.

As shown, a hold-down or separator, designated as a whole by 30, is positioned between each two successive work pieces. These clamps, one of which is shown in detail in Figure 2, each comprise a slab or body member 32 relatively narrow in one horizontal dimension (from left to right in Figure 1) and having slightly inclined side faces 34, 36 to provide a taper giving less thickness at the bottom. Each hold-down includes a clamp or lock device having spaced cam portions 38, by means of which it is releasably secured to table 10. As shown in Figure 2, the body or block 32 has a vertical bore which loosely receives a bolt 40, whose lower end is threaded into a square T-slot nut 42 of usual form, slidable (when not clamped tight) in the T-slot 18. The body 32 is cut away adjacent the bore as shown at 37 to minimize the possibility of chips packing in the bore.

In loose condition, one or several of the hold-down separators are interspersed with the workpieces. To facilitate this, the square nut 42 may have one face dimension small enough to pass through the neck of the T-slot while threaded on bolt 40. A quarter turn of the nut, followed by lifting on the bolt 40, engages the nut with the slot walls and prevents further rotation. This enables the pieces to be assembled without removing either of the vise jaws from the table, and either before or after the workpieces are put in place.

The upper end of bolt 40 has a flattened head portion 44 pivoted as by pin 46 between the spaced cam portions 38 of the clamping device. The peripheral surfaces of portions 38 may be non-circular, or as shown, may be circular and eccentric to pin 46, the center of the peripheral portions being marked 48 in Figure 2. A handle 50 is connected to portions 38, or it may be integral therewith. Portions 38 form a yoke pivotally embracing the flattened bolt head 44. Handle 50 may be rotated to tighten bolt 40 to secure body 32 to the table, and the device locked in place by depressing the handle to force portions 38 firmly upon the top of body 32.

When all the hold-downs are tight, all the workpieces of Figure 1 are firmly held. The downward taper of each body 32 absolutely prevents any workpiece from rising away from table 10. The action is simple, fast and positive. When a single workpiece is being cut, the hold-downs may easily be removed, but in many cases they may be left between the vise jaws, since they act merely as spacers in such case.

While the invention has been described above in connection with a particular form or embodiment thereof, changes may be made in the details without departing from the invention as defined in the appended claim. For example, the "spacing function" as distinct from the "hold-down function" of the illustrated tapered wedges has utility in and of itself, in that the clearance provided by the spaces permits the saw teeth to discharge chips. If, for example, a number of flat or squared sections of equal thickness were placed in range of the saw without spaces, a large portion of the saw teeth would fail to clear themselves, with the result that total sawing time on a plurality of adjacent pieces would present no improvement in time per piece over sawing the same pieces individually. The clearance provided by the spaces, whether tapered or not (and in the case, certainly, of rectangular cross-sections the taper is not indispensable) gives an opportunity for chips to clear the saw teeth so that the time required in making a multiple cut of several sections is not substantially greater than would be the time required to cut any one of the multiple sections. It is further to be noted that while the cam headed handles for lightening the tapered wedges represent an element of convenience, which is important under present wage scales, the same result could be obtained, though less conveniently by the use of T-headed bolts pierced through the wedges or spacers and set into firm engagement by having their upper ends in threaded engagement with ordinary nuts.

What is claimed is:

For use with a power driven cut off saw or the like, in combination: a base plate, opposed clamping jaws at opposite sides of said plate, said jaws having working faces extending above said plate to a height greater than that of any work to be clamped; a plurality of hold-down separators intermediate said jaws, said separators having plane, opposed working faces, the faces of each separator converging toward the base plate, each separator being integral and having a single vertical aperture; holding means freely penetrating said apertures and engaging said bed plate.

References Cited in the file of this patent

UNITED STATES PATENTS

| | | | |
|---|---|---|---|
| Re. 22,641 | Barnes | May 15, | 1945 |
| 65,873 | Cabell | June 18, | 1867 |
| 744,559 | Kendrick | Nov. 17, | 1903 |
| 1,820,667 | Leyes | Aug. 25, | 1931 |
| 2,430,613 | Hodge | Nov. 11, | 1947 |